United States Patent
Murray

(10) Patent No.: US 11,516,147 B2
(45) Date of Patent: Nov. 29, 2022

(54) BLOCKCHAIN-BASED DYNAMIC STORAGE PROVISIONER

(71) Applicant: Red Hat, Inc., Raleigh, NC (US)

(72) Inventor: Dylan Murray, Wake Forest, NC (US)

(73) Assignee: Red Hat, Inc., Raleigh, NC (US)

( * ) Notice: Subject to any disclaimer, the term of this patent is extended or adjusted under 35 U.S.C. 154(b) by 32 days.

(21) Appl. No.: 16/591,222

(22) Filed: Oct. 2, 2019

(65) Prior Publication Data
US 2021/0105224 A1    Apr. 8, 2021

(51) Int. Cl.
| | | |
|---|---|---|
| *H04L 47/783* | (2022.01) | |
| *H04L 47/70* | (2022.01) | |
| *H04L 49/9005* | (2022.01) | |
| *G06F 16/182* | (2019.01) | |
| *G06F 16/18* | (2019.01) | |
| *H04L 9/06* | (2006.01) | |
| *H04L 9/08* | (2006.01) | |
| *G06F 9/50* | (2006.01) | |

(Continued)

(52) U.S. Cl.
CPC .......... *H04L 47/783* (2013.01); *G06F 9/5016* (2013.01); *G06F 16/183* (2019.01); *G06F 16/1865* (2019.01); *H04L 9/0637* (2013.01); *H04L 9/0825* (2013.01); *H04L 47/826* (2013.01); *H04L 49/9005* (2013.01); *H04L 67/1097* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 10,001,933 B1 * | 6/2018 | Johnson | G06F 3/0665 |
| 10,713,722 B2 * | 7/2020 | Gordon, III | G06Q 40/04 |

(Continued)

FOREIGN PATENT DOCUMENTS

| | | |
|---|---|---|
| CN | 108924092 | 11/2018 |
| CN | 109120639 | 1/2019 |

(Continued)

OTHER PUBLICATIONS

Dynamic Volume Provisioning—Kubernetes; The Kubernetes Authors; https://kubernetes.io/docs/concepts/storage/dynamic-provisioning/; retrieved May 28, 2019; pp. 1-5.

(Continued)

*Primary Examiner* — Younes Naji
(74) *Attorney, Agent, or Firm* — K&L Gates LLP

(57) ABSTRACT

Methods and systems for dynamically provisioning storage on a blockchain are provided. In one embodiment, a method is provided that includes receiving a request that includes a data unit for storage. The data unit may be buffered in a data stack that stores one or more data units. The data unit may be stored in the data stack until (i) a predetermined amount of time has passed and/or (ii) a size of the data stack exceeds a predetermined threshold. The data units stored in the data stack may then be encrypted and included in one or more storage transactions. The storage transactions may also include encryption keys used to encrypt the data units. The storage transactions may then be transmitted to nodes for storage on a blockchain.

20 Claims, 7 Drawing Sheets

(51) Int. Cl.
*H04L 67/1097*     (2022.01)
*H04L 9/00*        (2022.01)

(56) References Cited

U.S. PATENT DOCUMENTS

| | | | |
|---|---|---|---|
| 2014/0025711 A1* | 1/2014 | Avati | G06F 16/196 |
| | | | 707/827 |
| 2017/0207917 A1* | 7/2017 | Davis | H04L 9/3066 |
| 2018/0159688 A1* | 6/2018 | Staple | H04L 9/3236 |
| 2019/0018984 A1 | 1/2019 | Setty et al. | |
| 2019/0028280 A1* | 1/2019 | Zinder | G06F 21/6254 |
| 2019/0104196 A1 | 4/2019 | Li et al. | |
| 2019/0149418 A1 | 5/2019 | Bertsche et al. | |
| 2019/0173667 A1* | 6/2019 | Wang | H04L 63/08 |
| 2020/0028688 A1* | 1/2020 | Takada | H04L 9/3239 |
| 2020/0159696 A1* | 5/2020 | Adluri | H04L 9/14 |
| 2020/0226628 A1* | 7/2020 | Snider | H04W 4/029 |
| 2021/0342828 A1* | 11/2021 | Magerkurth | G06Q 20/401 |

FOREIGN PATENT DOCUMENTS

| | | | |
|---|---|---|---|
| CN | 109769009 | | 5/2019 |
| CN | 110648234 | * | 9/2019 |

OTHER PUBLICATIONS

Simplify Container Storage Management; Red Hat NetApp; 2016; (2 pages).

* cited by examiner

BLOCKCHAIN-BASED DYNAMIC STORAGE PROVISIONER

BACKGROUND

Programs running in cloud environments may be executed using computer hardware associated with the cloud environments. For example, the cloud environment may contain computing hardware that executes programs upon receiving requests (e.g., requests containing or otherwise identifying programs for execution). In certain instances, the computing hardware may include one or more processors, memories, and/or storage devices.

SUMMARY

The present disclosure presents new and innovative systems and methods for provisioning storage on a blockchain. In one embodiment, a method is provided including receiving a request including at least one data unit for storage, buffering the at least one data unit in a data stack storing one or more data units until one or both of (i) a predetermined amount of time has passed or (ii) a size of the data stack exceeds a predetermined threshold, and encrypting the one or more data units stored in the data stack with one or more corresponding encryption keys to generate one or more encrypted data units. The method may further include generating a storage transaction including the one or more encrypted data units and the one or more corresponding encryption keys and uploading the storage transaction to one or more nodes for storage on a blockchain.

In another embodiment, a system is provided including a processor and a memory. The memory may store instructions which, when executed by the processor, cause the processor to receive a request including at least one data unit for storage, buffer the at least one data unit in a data stack storing one or more data units until one or both of (i) a predetermined amount of time has passed or (ii) a size of the data stack exceeds a predetermined threshold, and encrypt the one or more data units stored in the data stack with one or more corresponding encryption keys to generate one or more encrypted data units. The memory may store further instructions which, when executed by the processor, cause the processor to generate a storage transaction including the one or more encrypted data units and the one or more corresponding encryption keys and upload the storage transaction to one or more nodes for storage on a blockchain.

In yet another embodiment, a non-transitory, computer-readable medium is provided storing instructions which, when executed by a processor, cause the processor to receive a request including at least one data unit for storage, buffer the at least one data unit in a data stack storing one or more data units until one or both of (i) a predetermined amount of time has passed or (ii) a size of the data stack exceeds a predetermined threshold, and encrypt the one or more data units stored in the data stack with one or more corresponding encryption keys. The non-transitory, computer-readable medium may store further instructions which, when executed by the processor, cause the processor to generate a storage transaction including the data stack and the one or more corresponding encryption keys and upload the storage transaction to one or more nodes for storage on a blockchain.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

When programs executing within a cloud environment require persistent storage, cloud environments (e.g., Kubernetes® or Docker® cloud computing environment) may typically allocate space within a configured storage class. The configured storage class may identify a storage location at which the required persistent storage is to be created. Storage classes may, in certain implementations, be hosted by the user. For example, a user may host a public or private storage system on a computing machine or on computing hardware that the user maintains. However, such implementations may require excessive setup and maintenance time and may require large amounts of storage and network bandwidth. In other implementations, the storage classes may be provided by one or more parties (e.g., third parties) not associated with a user or user requesting performance of the programs. However, such third party storage classes may not be controllable by the user and/or the cloud computing environment. Additionally, third party storage classes may impose storage limits and may charge for storage space. In either instance, there exists a need to store data using the storage classes in a reliable manner while also providing additional storage services, including data integrity and data immutability. Additionally, it may also be desirable or necessary for the data to be stored in a manner that avoids the storage limits and storage fees of third part storage classes.

One solution to the above-identified problems is to store data on a blockchain such that the data is accessible to processes and devices executing in the cloud computing environment. For example, requests may be received to store data in a persistent storage class. Data contained within these requests may be buffered and, once sufficient time has passed and/or the buffered data exceeds a predetermined size threshold, buffered data may be stored on the blockchain. For example, the data may be stored on the blockchain in one or more transactions that include the data and thereby store the data on the blockchain. The data may be encrypted before generating the storage transactions using one or more encryption keys, and the transactions may also include the encryption keys for subsequent decoding of the encrypted data. In this way, publically-accessible storage may be provided while also providing security through encryption of the data and immutability of stored data as ensured by consensus algorithms of the blockchain.

Figure 1:
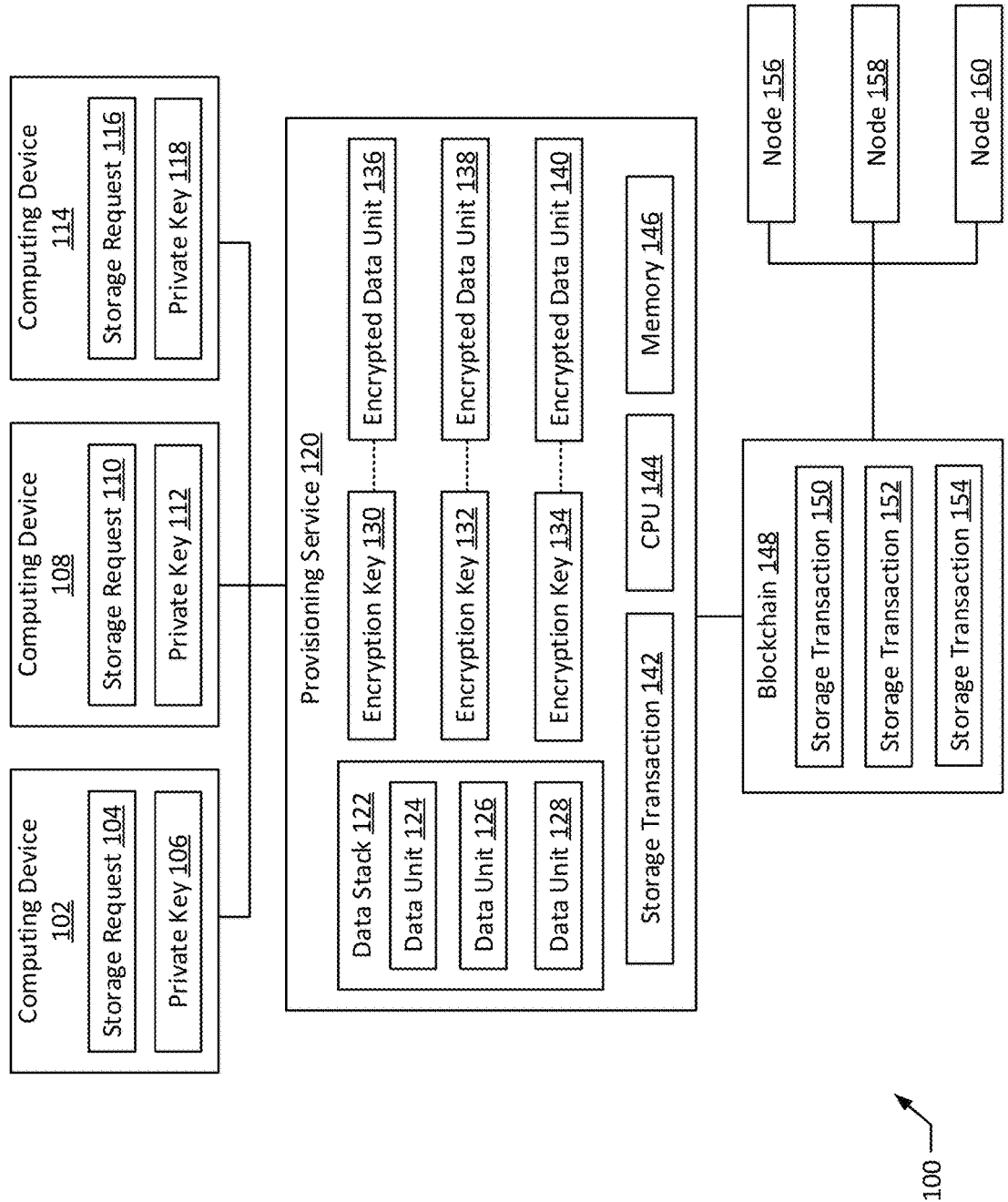
FIG. 1 illustrates a system according to an exemplary embodiment of the present disclosure.

FIG. 1 illustrates a system 100 according to an exemplary embodiment of the present disclosure. The system 100 may be configured to receive and process requests to store data. For example, the system 100 may be configured to at least partially implement a storage class for use by cloud computing environments (e.g., to provide persistent storage for cloud computing environments). The system includes computing device 102, 108, 114, a provisioning service 120, a blockchain 148, and nodes 156, 158, 160.

The computing devices 102, 108, 114 may be configured to generate storage requests 104, 110, 116 specifying data for storage by the provisioning service 120. For example, the storage requests 104, 110, 116 may specify specific data items of types of data to be stored by the provisioning service 120. As another example, the storage requests 104, 110, 116 may specify particular data items resulting from one or more processes (e.g., executing one or more programs in a cloud environment associated with the provisioning service 120). In certain implementations, the storage requests 104, 110, 116 may specify that data be stored on a blockchain 148. Each computing device 102, 108, 114 may also have an associated private key 106, 112, 118. The private key 106, 112, 118 may be associated with a user account, service account, or other credential associated with the computing device 102, 108, 114 (e.g., a key associated with a user account of a cloud environment associated with the provisioning service 120).

The provisioning service 120 may be configured to receive storage requests 104, 110, 116 from the computing devices 102, 108, 114 and to store data from the storage requests 104, 110, 116. In particular, the provisioning service 120 may be configured to store data from the storage requests 104, 110, 116 on the blockchain 148. To store data, the provisioning service 120 may extract data units 124, 126, 128 from the storage requests 104, 110, 116. For example, one or more of the storage requests 104, 110, 116 may store one or more data units 124, 126, 128 for storage, which the provisioning service 120 may extract in order to store the data units 124, 126, 128 on the blockchain 148.

The provisioning service 120 may store the data units 124, 126, 128 in a data stack 122 prior to storing the data units 124, 126, 128 on the blockchain 148. In particular, the data stack 122 may be used to buffer incoming data units 124, 126, 128 from received storage requests 104, 110, 116 prior to uploading the data units 124, 126, 128 on the blockchain 148. For example, the provisioning service 120 may store incoming data units 124, 126, 128 in the data stack 122 until the data stack 122 is full or nearly full (e.g., such that the total size of the data units 124, 126, 128 stored in the data stack 122 exceeds a predetermined threshold). In additional or alternative implementations, the provisioning service 120 may store data units 124, 126, 128 in the data stack 122 until a predetermined time period has passed (e.g., 50 ms, 500 ms, 1 second, 30 seconds).

To store the data units on the blockchain 148, the provisioning service 120 may generate a storage transaction 142 based on one or more of the data units 124, 126, 128. For example, in certain implementations the provisioning service 120 may generate a storage transaction 142 containing all of the data units 124, 126, 128 in the data stack 122. In additional or alternative implementations, the provisioning service 120 may generate multiple storage transactions 142, each containing one or more of the data units 124, 126, 128 stored in the data stack 122. In certain implementations, rather than storing the data units 124, 126, 128 themselves, the provisioning service 120 may encrypt the data unit 124, 126, 128 to generate encrypted data units 136, 138, 140 that are included in the one or more storage transactions 142. For example, the provisioning service 120 may encrypt the data unit 124 with the encryption key 130 to generate the encrypted data unit 136, may encrypt the data unit 126 with the encryption key 132 to generate the encrypted data unit 138, and may encrypt the data unit 128 with the encryption key 134 to generate the encrypted data unit 140. The encryption keys 130, 132, 134 may correspond to the computing devices 102, 108, 114 from which the data units 124, 126, 128 were received. For example, the encryption keys 130, 132, 134 used to generate the encrypted data units 136, 138, 140 may be the private keys 106, 112, 118 of the computing devices 102, 108, 114. As explained further below, the storage transaction 142 may include additional information that can be used to identify the encrypted data units 136, 138, 140 and/or the storage transaction 142. For example, the storage transaction 142 may include information (e.g., metadata) identifying the provisioning service 120 and/or a cloud computing environment associated with the provisioning service 120, the computing device 102, 108, 114 requesting storage of the data unit 124, 126, 128, and/or a program or application associated with the data unit 124, 126, 128.

The provisioning service 120 may upload storage transactions 142 to the blockchain 148 for storage. In particular, the blockchain 148 may be configured to receive and store storage transactions 150, 152, 154 similar to the storage transaction 142 discussed above. The storage transactions 150, 152, 154 may be stored as part of a distributed ledger that stores transactions such as the storage transactions 150, 152, 154 in an immutable fashion such that the contents of the storage transactions 150, 152, 154 cannot be altered. The blockchain 148 may be implemented by one or more nodes 156, 158, 160. The nodes may represent computing devices responsible for receiving and processing transactions including storage transactions 150, 152, 154. The nodes 156, 158, 160 may store received transactions according to a consensus algorithm, such as a proof of work consensus algorithm and/or a proof of stake consensus algorithm. Once consensus is reached regarding received transactions (e.g., based on the consensus algorithm), the nodes 156, 158, 160 may store copies of the transactions, including the storage transactions 150, 152, 154.

The blockchain 148 may store transactions of different types. For example, in addition to the storage transactions 150, 152, 154, the blockchain 148 may store other types of transactions, such as, e.g., cryptocurrency transfer transactions. In certain implementations, one or more of the nodes 156, 158, 160 may be affiliated with entities and/or individuals other than the entity or organization implementing the provisioning service 120. For example, the blockchain 148 may be implemented at least in part by a public blockchain, including cryptocurrency blockchains such as, e.g., the Bitcoin blockchain and/or the Ethereum® blockchain. Other public blockchains may be apparent to those skilled in the art based on the present disclosure and all such blockchains are contemplated herein. In additional or alternative implementations, one or more of the nodes may be affiliated with an entity implementing the provisioning service 120. For example, the blockchain 148 may be implemented at least in part by a private blockchain implemented by an entity implementing the provisioning service 120.

The provisioning service 120 includes a CPU 144 and a memory 146, which may implement one or more features of the provisioning service 120. For example, the memory 146 may store instructions which, when executed by the CPU 144, cause the CPU 144 to perform one or more of the functions of the provisioning service 120. Additionally, although not depicted, one or more of the computing devices 102, 108, 114 and the nodes 156, 158, 160 may include a CPU and/or a memory configured to implement one or more features of the computing devices 102, 108, 114 and/or the nodes 156, 158, 160.

Figure 2A:
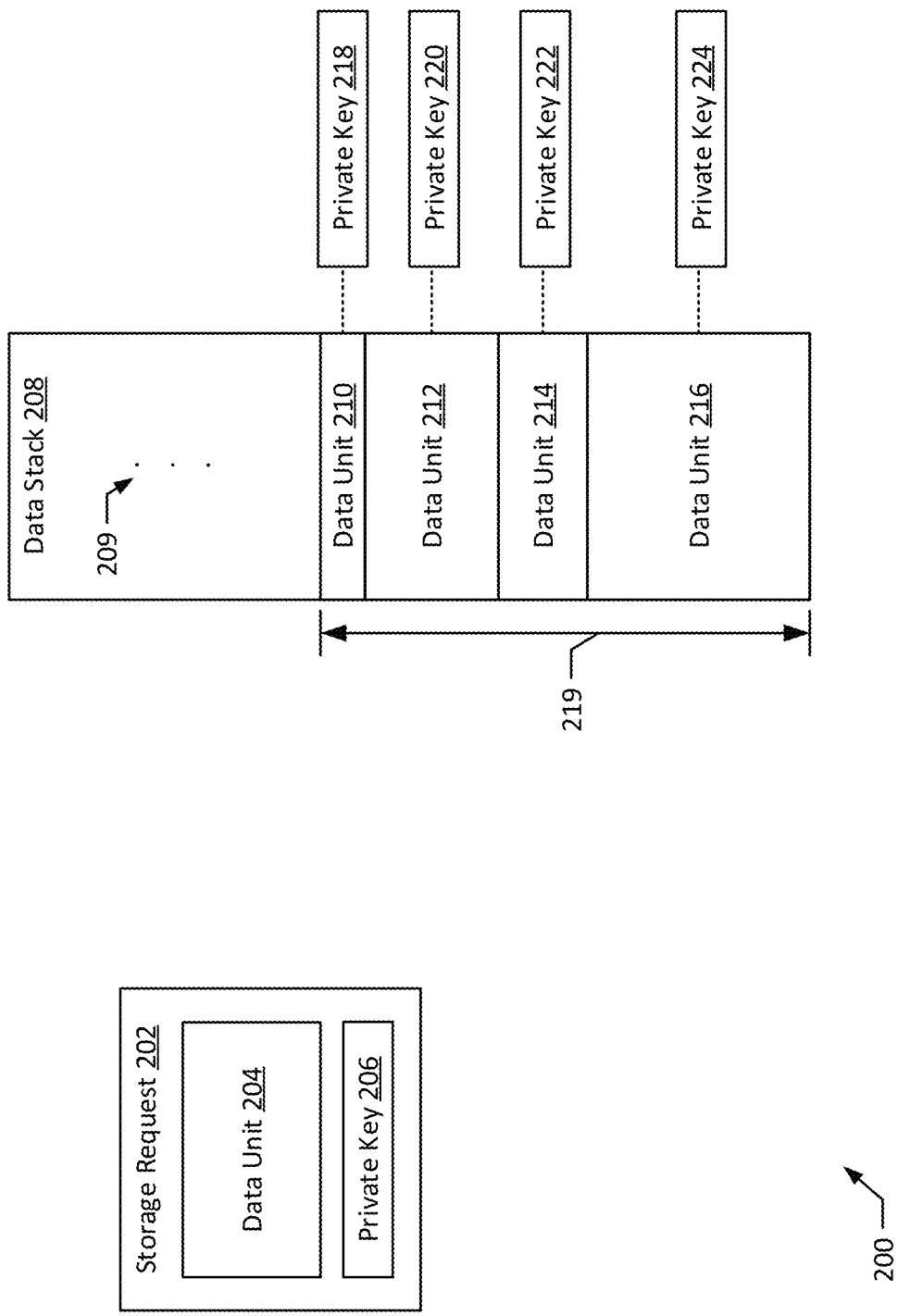
FIGS. 2A-2B illustrate data stack configurations according to exemplary embodiments of the present disclosure.
Figure 2B:
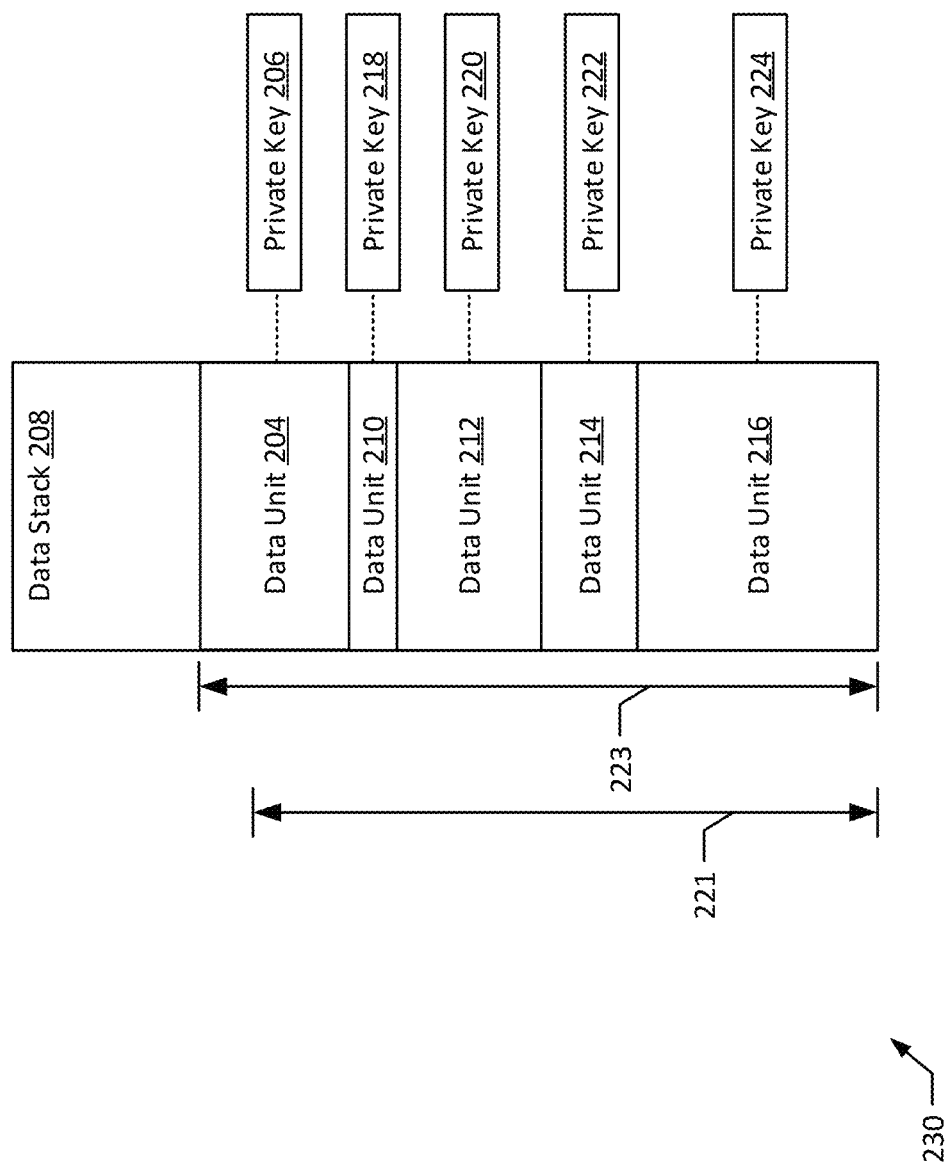
Figure 2C:
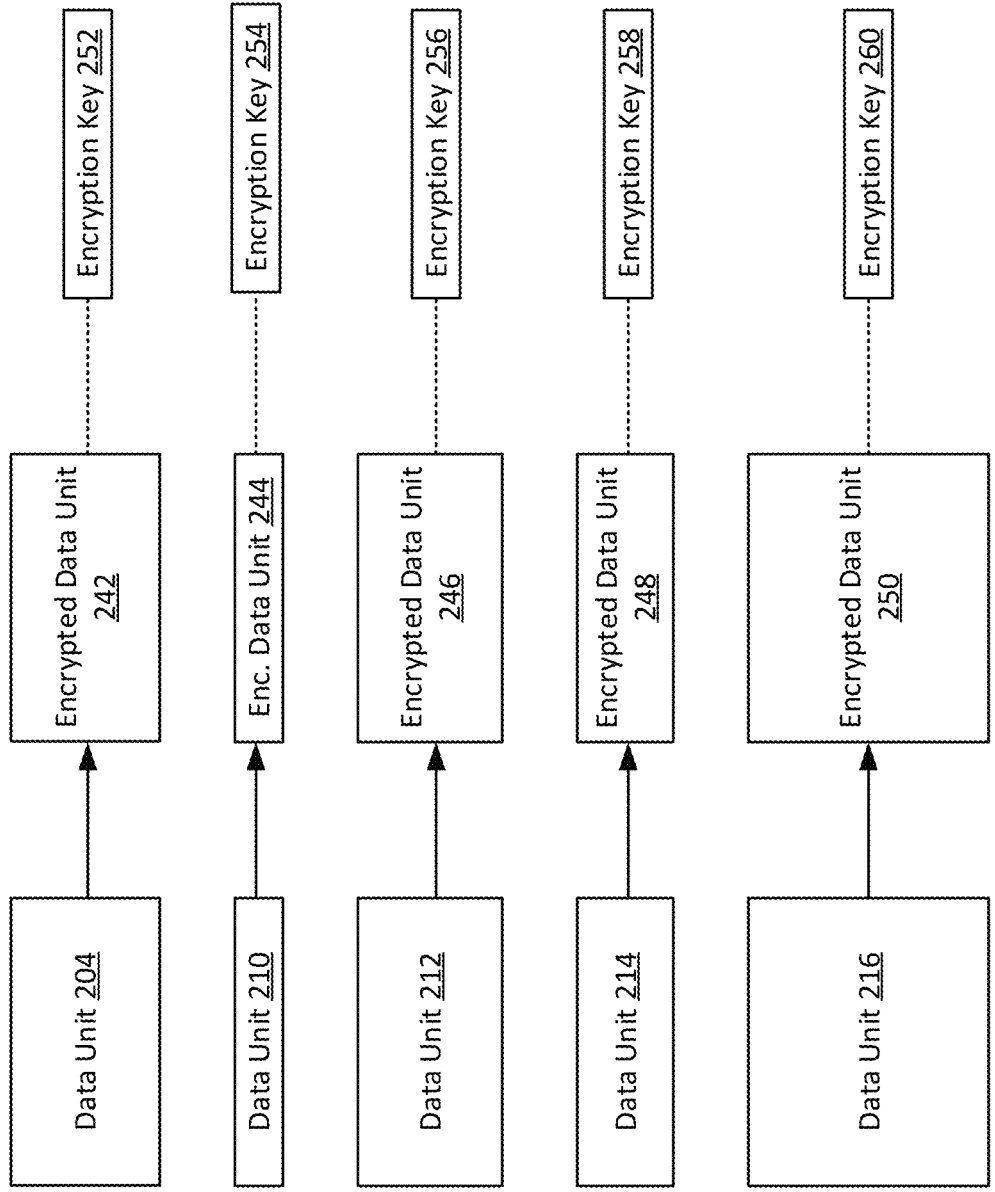
FIG. 2C illustrates encrypted data unit configurations according to an exemplary embodiment of the present disclosure.

FIGS. 2A-2B illustrate data stack configurations 200, 230 according to exemplary embodiments of the present disclosure. FIG. 2C illustrates an encrypted data unit configuration 240 according to an exemplary embodiment of the present disclosure. The data stack configurations 200, 230 and the encrypted data unit configuration 240 may, in combination, depict operations of the provisioning service 120. In particular, the data stack configurations 200, 230 may illustrate the receipt and processing of a storage request by the provisioning service 120 and the encrypted data unit configuration 240 may depict the generation of encrypted data units for use with one or more storage transactions.

The data stack configuration 200 includes a storage request 202 and a data stack 208. The storage request 202 may be received, e.g., from a computing device 102, 108, 114. The storage request 202 contains a data unit 204 for storage on the blockchain 148 and a private key 206. As explained above, the private key 206 may be associated with a computing device 102, 108, 114 that created the storage request 202. For example, the private key 206 may represent a private key associated with the computing device 102, 108, 114 in a cloud computing environment associated with the provisioning service 120 (e.g., a Kubernetes® key associated with a user of the computing device 102, 108, 114).

When the storage request 202 is received, the data stack 208 may contain other data units 210, 212, 214, 216. The data units 210, 212, 214, 216 may have been previously received, e.g., via storage requests from computing devices 102, 108, 114 identical to or different from the computing device 102, 108, 114 from which the storage request 202 is received. As depicted, the data units 210, 212, 214, 216 are different sizes, and therefore take up different amounts of space (e.g., memory) in the data stack 208. In particular, the data units 210, 212, 214, 216 take up a first amount of space 219 when the storage request 202 is received. Each data unit 210, 212, 214, 216 also has a corresponding private key 218, 220, 222, 224, which may have been received with the data units 210, 212, 214, 216 in a corresponding storage request 202. Similar to the private keys 106, 112, 118, 206, the private keys 218, 220, 222, 224 may correspond to a computing device 102, 108, 114 and/or a user from which the data units 210, 212, 214, 216 are received.

Upon receiving the storage request 202, the data unit 204 may be added to data stack 208. For example, the data stack 208 has free space 209 and the data unit may be stored on the data stack 208 if the size of the data unit 204 is less than the size of the free space 209. For example, FIG. 2B depicts a data stack configuration 230 in which the data unit 204 is stored in the data stack 208. Once stored, the total size 223 of the data units 204, 210, 212, 214, 216 stored in the data stack 208 exceeds the threshold 221. Once the size exceeds the threshold 221, the provisioning service 120 may proceed with generating one or more storage transactions 142 to store the data units 204, 210, 212, 214, 216 on the blockchain 148. For example, in the data stack configuration 200, the size 219 of the stored data units 210, 212, 214, 216 is less than the threshold 221. However, in the data stack configuration 230, the size 223 of the stored data units 204, 210, 212, 214, 216 is greater than the threshold 221. The threshold 221 may represent a measure of the size of stored data units 204, 210, 212, 214, 216 that causes the provisioning service 120 to create the storage transactions 142. For example, the threshold 221 may include, e.g., 500 MB of stored data units, 1 GB of stored data units, 10 GB of stored data units. The threshold 221 may additionally or alternatively represent a percentage of a total storage capacity of the data stack 208 that, when filled, causes the provisioning service 120 to create the storage transactions 142. For example, the threshold 221 may indicate, e.g., 50% of the capacity of the data stack 208, 75% of the capacity of the data stack 208, 95% of the capacity of the data stack 208. As a further example, the threshold 221 may indicate a certain number of disk sectors, hard drives, and/or pieces or proportions of computing hardware implementing the data stack 208 that have filled capacities storing data units. As described above, the provisioning service 120 may additionally or alternatively generate storage transactions 142 according to other conditions. For example, the provisioning service 120 may generate storage transactions at certain, predetermined time intervals, e.g., when requested to do so by a computing device 102, 108, 114 or when requested to do so by a software process, such as a software process of a cloud computing environment associated with the provisioning service 120.

The encrypted data unit configuration 240 in FIG. 2C depicts an exemplary generation of encrypted data units 242, 244, 246, 248, 250 based on the data units 204, 210, 212, 214, 216 stored on the data stack 208. The provisioning service 120 may encrypt the data units 204, 210, 212, 214, 216 using associated encryption keys 252, 254, 256, 258, 260 to generate the encrypted data units 242, 244, 246, 248, 250. The encryption keys 252, 254, 256, 258, 260 may correspond to the private keys 206, 218, 220, 222, 224. For example, the provisioning service 120 may use the private keys 206, 218, 220, 222, 224 as the encryption keys 252, 254, 256, 258, 260. As another example, the provisioning service 120 may generate the encryption keys 252, 254, 256, 258, 260 based on the private keys 206, 218, 220, 222, 224 (e.g., by hashing or combining the private keys 206, 218, 220, 222, 224 with another key, such as a private key of the provisioning service 120). For example, the encryption keys 252, 254, 256, 258, 260 may be generated such that the encrypted data units 242, 244, 246, 248, 250 may be decrypted using the encryption keys 252, 254, 256, 258, 260 and the private keys 206, 218, 220, 222, 224. The encrypted data units 242, 244, 246, 248, 250 may then be included in storage transaction for storage on the blockchain 148.

Figure 3:
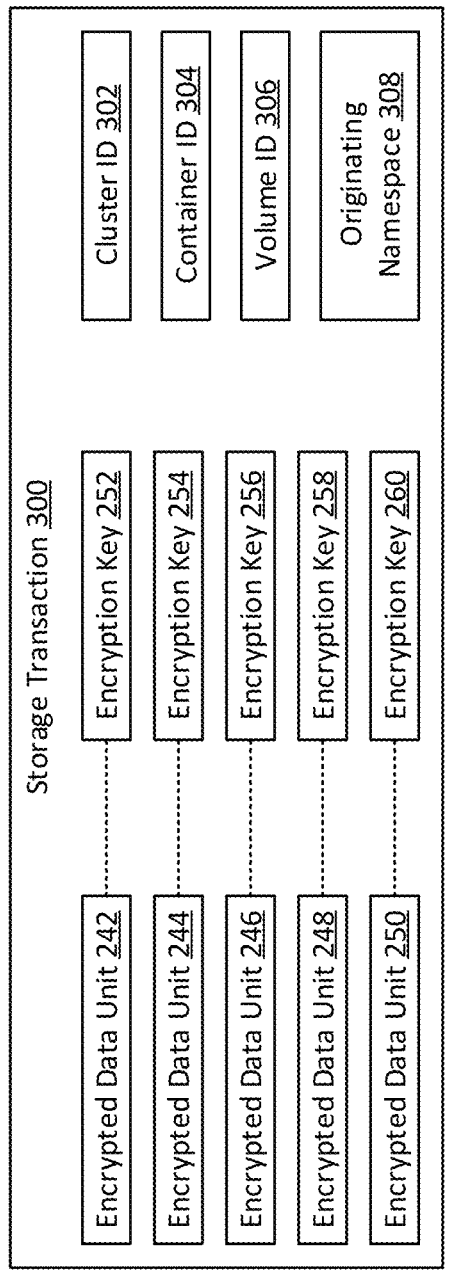
FIG. 3 illustrates a storage transaction according to an exemplary embodiment of the present disclosure.

FIG. 3 illustrates a storage transaction 300 according to an exemplary embodiment of the present disclosure. The storage transaction 300 may be generated (e.g., generated by the provisioning service 120) to include the encrypted data units 242, 244, 246, 248, 250. The storage transaction 300 may also be generated to include additional information. The additional information may specify or indicate a source corresponding to each encrypted data unit 242, 244, 246, 248, 250, such as information regarding the computing device 102, 108, 114 which the encrypted data unit 242, 244, 246, 248, 250 was received. As another example, the additional information may identify a cloud computing environment (e.g., a Kubernetes® environment, a Docker® environment) corresponding to the data units 204, 210, 212, 214, 216 and/or the provisioning service 120. In particular, as depicted, the additional information may include a cluster ID 302 identifying a cluster (e.g., a Kubernetes® cluster, a Docker® cluster) of nodes of the cloud computing environment from which the data units 204, 210, 212, 214, 216 were received. The storage transaction 300 may also include a container ID 304 identifying a container of the cloud computing environment from which the data units 204, 210, 212, 214, 216 were received and/or volume ID 306 identifying a volume from which the data units 204, 210, 212, 214, 216 were received. Further, the storage transaction 300 may include an originating namespace 308 identifying the namespace from which the data units 204, 210, 212, 214, 216 originated.

As depicted, the storage transaction 300 includes a single cluster ID 302, a single container ID 304, a single volume ID 306, and a single originating namespace 308. Such implementations may be utilized when the data units 204, 210, 212, 214, 216 originated from the same namespace, volume, container, and cluster. However, in certain implementations, the storage transaction 300 may include multiple cluster IDs 302, multiple container IDs 304, multiple volume IDs 306, and/or multiple originating namespace is 308. For example, where one or more of the data units 204, 210, 212, 214, 216 originate from different namespaces, volumes, containers, and/or clusters, the storage transaction 300 may include multiple corresponding cluster IDs 302, container IDs 304, volume IDs 306, and/or originating namespace is 308. In such implementations, the cluster IDs 302, container IDs 304, volume IDs 306, and/or namespaces 308 may be stored in association with corresponding encrypted data units 242, 244, 246, 248, 2502 identify which encrypted data units 242, 244, 246, 248, 250 correspond to each cluster ID 302, container ID 304, volume ID 306, and/or originating namespace 308. In still further implementations, where the data units 204, 210, 212, 214, 216 originate from different namespaces, volumes, containers, and/or clusters, the provisioning service 120 may generate separate storage transaction 300 for each cluster, container, volume, and/or namespace.

Figure 4:
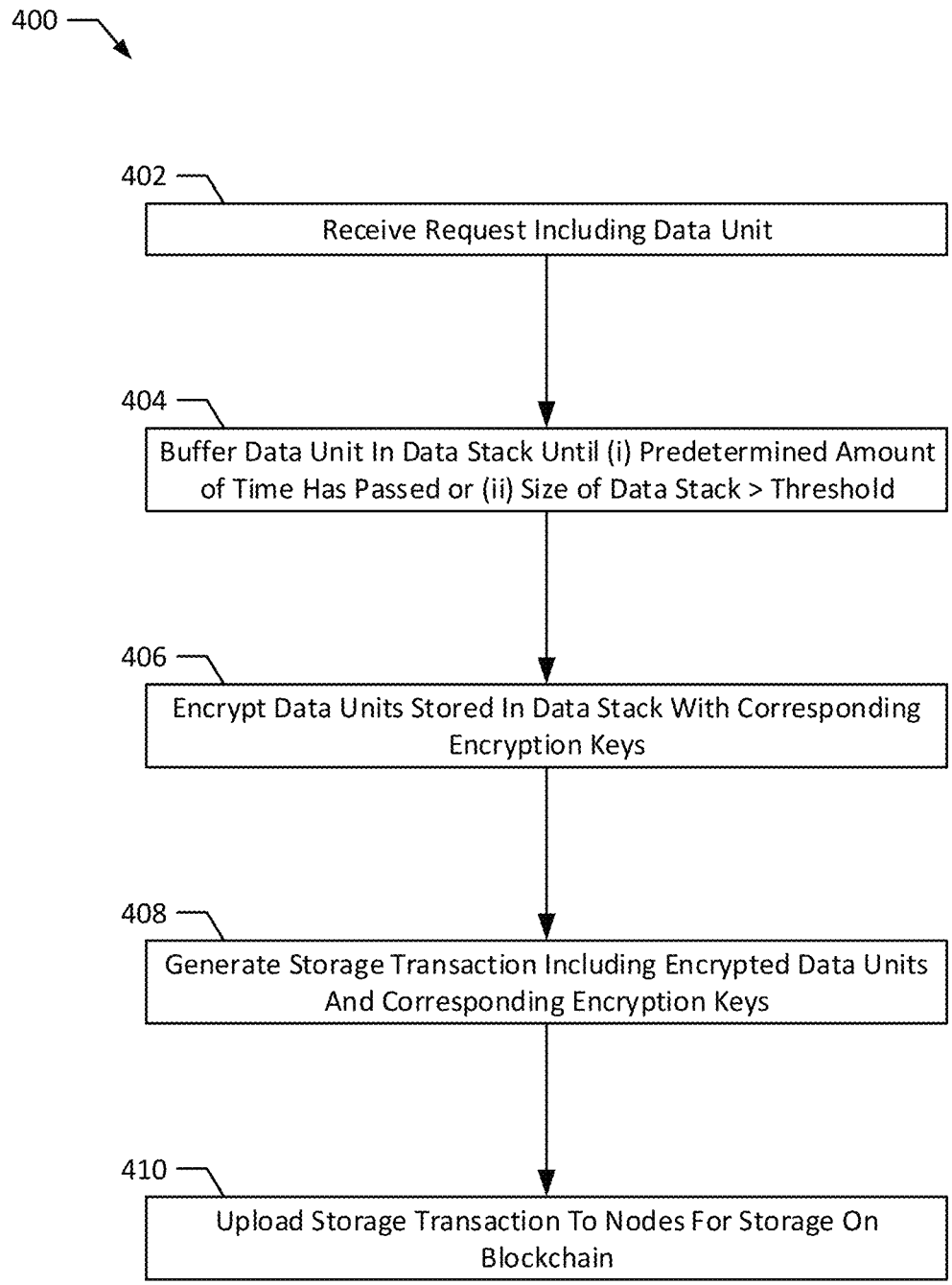
FIG. 4 illustrates a method according to an exemplary embodiment of the present disclosure.

FIG. 4 illustrates a method 400 according to an exemplary embodiment of the present disclosure. The method 400 may be performed to receive and process requests to store data units on a blockchain. For example, the method 400 may be performed at least in part to implement one or more functions of the provisioning service 120. The method 400 may be implemented on a computer system, such as the system 100. For example, the method 400 may be implemented at least in part by one or more of the computing devices 102, 108, 114, the provisioning service 120, the blockchain 148, and/or the nodes 156, 158, 160. The method 400 may also be implemented by a set of instructions stored on a computer readable medium that, when executed by a processor, cause the computer system to perform the method. For example, all or part of the method 400 may be implemented by the CPU 144 in the memory 146. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 400 begins with receiving a request that includes a data unit (block 402). For example, the provisioning service 120 may receive a storage request 104, 110, 116, 202 from a computing device 102, 108, 114. The storage request 104, 110, 116, 202 may include a data unit 204 for storage on a blockchain 148.

The data unit may then be buffered in a data stack until (i) a predetermined amount of time has passed or (ii) a size of the data stack exceeds a threshold (block 404). For example, the provisioning service 120 may buffer the data unit 204 in a data stack 122, 208 as explained above in connection with FIGS. 2A-2C. In particular, the data unit 204 may be stored in free space 209 of the data stack 122, 208. While buffered on the data stack 122, 208, the data unit 204 may be stored in the data stack with one or more additional data units 124, 126, 128, 210, 212, 214, 216. The additional data units 124, 126, 128, 210, 212, 214, 216 may be received by the provisioning service 120 before and/or after receiving the data unit 204. For example, the provisioning service 120 may receive storage requests 104, 110, 116, 202 from the same computing device 102, 108, 114 as the storage request 104, 110, 116, 202 received at block 402. The additional data units 124, 126, 128, 210, 212, 214, 216 may also be received from a different computing device 102, 108, 114 than the storage request 104, 110, 116, 202 received at block 402.

The provisioning service 120 may store the data unit 204 with the additional data units 124, 126, 128, 210, 212, 214, 216 until certain criteria are met. In one implementation, the provisioning service 120 may store the data units 124, 126, 128, 204, 210, 212, 214, 216 until a predetermined amount of time has passed. For example, the provisioning service 120 may store the data units 124, 126, 128, 204, 210, 212, 214, 216 until a predetermined amount of time (e.g., one minute, 10 minutes, 30 minutes) since receiving the first data unit of the stored data units 124, 126, 128, 204, 210, 212, 214, 216. Additionally or alternatively, the provisioning service 120 may store the data units 124, 126, 128, 204, 210, 212, 214, 216 until a size of the data stack 122, 208 exceeds a predetermined threshold. For example, the provisioning service 120 may store data units 124, 126, 128, 204, 210, 212, 214, 216 on the data stack 122, 208 until size of the data stack 122, 208 (e.g., a combined size of the data units 124, 126, 128, 204, 210, 212, 214, 216) exceeds a predetermined threshold 221, as depicted in FIG. 2B. In certain implementations, the provisioning service 120 may combine multiple criteria for storage on the data stack 122, 208. For example, the provisioning service 120 may be configured to buffered data units 124, 126, 128, 204, 210, 212, 214, 216 for predetermined periods of time while also proceeding with further processing if the size of the stored data units 124, 126, 128, 204, 210, 212, 214, 216 exceeds a predetermined threshold 221.

The data units stored in the data stack may then be encrypted with corresponding encryption keys (block 406). For example, the provisioning service 120 may encrypt the data units 124, 126, 128, 204, 210, 212, 214, 216 stored in the data stack 122, 208 with corresponding encryption keys 130, 132, 134, 252, 254, 256, 258, 260. As described above, the encryption keys 130, 132, 134, 252, 254, 256, 258, 260 may be generated by the provisioning service 120 based on keys corresponding to computing devices 102, 108, 114 and/or user accounts from which the data units 124, 126, 128, 204, 210, 212, 214, 216 are received. For example, the provisioning service 120 may utilize the private keys 106, 112, 118 as the encryption keys 130, 132, 134 and/or may utilize the private keys 106, 112, 118 to generate the encryption keys 130, 132, 134. The provisioning service 120 may then encrypt the data units 124, 126, 128 using the associated encryption keys 130, 132, 134 to generate encrypted data units 136, 138, 140. The provisioning service 120 may then generate an association between the encrypted data units 136, 138, 140 and the encryption key 130, 132, 134 used to generate the encrypted data unit 136, 138, 140. The association may then be utilized to indicate which encryption keys 130, 132, 134 correspond to the encrypted data units 136, 138, 140 (e.g., in a storage transaction 142, 300).

A storage transaction may then be generated including the encrypted data units and corresponding encryption keys (block 408). For example, the provisioning service 120 may generate one or more storage transactions 142, 300 that include one or more encrypted data units 136, 138, 140, 242, 244, 246, 248, 250. In certain implementations, the storage transactions 142, 300 may include multiple encrypted data units 136, 138, 140, 242, 244, 246, 248, 250. For example, the storage transaction 142, 300 may include encrypted data units 136, 138, 140, 242, 244, 246, 248, 250 generated from each data unit 124, 126, 128, 204, 210, 212, 214, 216 stored in the data stack 122 at the time of generating the storage transaction 142, 300. As another example, a storage transaction 142, 300 may be generated to include encrypted data units 136, 138, 140, 242, 244, 246, 248, 250 generated from data units 124, 126, 128, 204, 210, 212, 214, 216 received from the same computing device 102, 108, 114 or originating from at least one of the same cluster, the same container, the same volume, and/or the same namespace within a cloud computing environment. In still further implementations, a storage transaction 142, 300 may be generated to include a single encrypted data unit 136, 138, 140, 242, 244, 246, 248, 250. In addition to the encrypted data units 136, 138, 140, 242, 244, 246, 248, 250, the storage transaction 300 may include additional information, such as the cluster ID 302, the container ID 304, volume ID 306, and/or the originating namespace 308, as discussed above. In certain implementations, the storage transactions 142, 300 may be signed using one or more of the encryption keys encryption keys 130, 132, 134, 252, 254, 256, 258, 260.

The storage transaction may then be uploaded to nodes for storage on a blockchain (block 410). For example, the provisioning service 120 may transmit the storage transactions 142, 300 to nodes 156, 158, 160 for storage on a blockchain 148 implemented at least in part by the nodes 156, 158, 160. After receiving the storage transactions 142, 300, the nodes 156, 158, 160 may append the storage transactions 142, 300 to the blockchain 148 according to one or more consensus algorithms, as discussed above.

Once added on the blockchain 148, the storage transaction 142, 300 may be immutably stored such that the contents of the storage transaction 142, 300 are unalterable. Accordingly, such storage of the encrypted data units 136, 138, 140, 242, 244, 246, 248, 250 may allow for reliable and trustworthy access of the encrypted data units 136, 138, 140, 242, 244, 246, 248, 250 as needed by the computing devices 102, 108, 114 (e.g., in subsequent execution of programs and/or applications that rely and data stored within the encrypted data units 136, 138, 140, 242, 244, 246, 248, 250). For example, the computing devices 102, 108, 114 may identify related encrypted data units 136, 138, 140, 242, 244, 246, 248, 250 by searching the blockchain (e.g., via the provisioning service 120) for storage transactions 142, 300 containing cluster IDs 302, container IDs 304, volume IDs 306, and/or originating namespaces 308 corresponding to a program and/or application for which stored data is desired. Once the encrypted data units 136, 138, 140, 242, 244, 246, 248, 250 are identified within the blockchain 148, copies of the encrypted data units 136, 138, 140, 242, 244, 246, 248, 250 may be retrieved from the blockchain 148 and encrypted by the computing devices 102, 108, 114. For example, the encrypted data units 136, 138, 140, 242, 244, 246, 248, 250 may be decrypted using the private keys 106, 112, 118, 206, 218, 220, 222, 224 associated with the computing devices 102, 108, 114. Once decrypted, the data units 124, 126, 128, 204, 210, 212, 214, 216 may be utilized as necessary by the computing devices 102, 108, 114.

Further, because the blockchain 148 may be publicly accessible and/or implemented by nodes 156, 158, 160 unaffiliated with the entity implemented in the provisioning service 120, persistent storage may be provisioned in this manner without relying on any particular third-party storage provider. Accordingly, storing data units 124, 126, 128, 204, 210, 212, 214, 216 in this manner addresses the shortcomings of existing persistent storage provision solutions without compromising retrievability or security of the stored encrypted data units 136, 138, 140, 242, 244, 246, 248, 250.

Additionally, because the provisioning service 120 buffers the received data units 124, 126, 128, 204, 210, 212, 214, 216 in the data stack 122, 208, the provisioning service 120 may avoid overloading the nodes 156, 158, 160 with numerous storage transactions 142, 300. In particular, by waiting for a predetermined period of time and/or until the stored data units 124, 126, 128, 204, 210, 212, 214, 216 exceed a threshold 220, the provisioning service 120 ensures that storage transactions 142, 300 are uploaded at a regular frequency while minimizing rapid increases in storage transaction 142, 300 volume in response to multiple received data units 124, 126, 128, 204, 210, 212, 214, 216.

Figure 5:
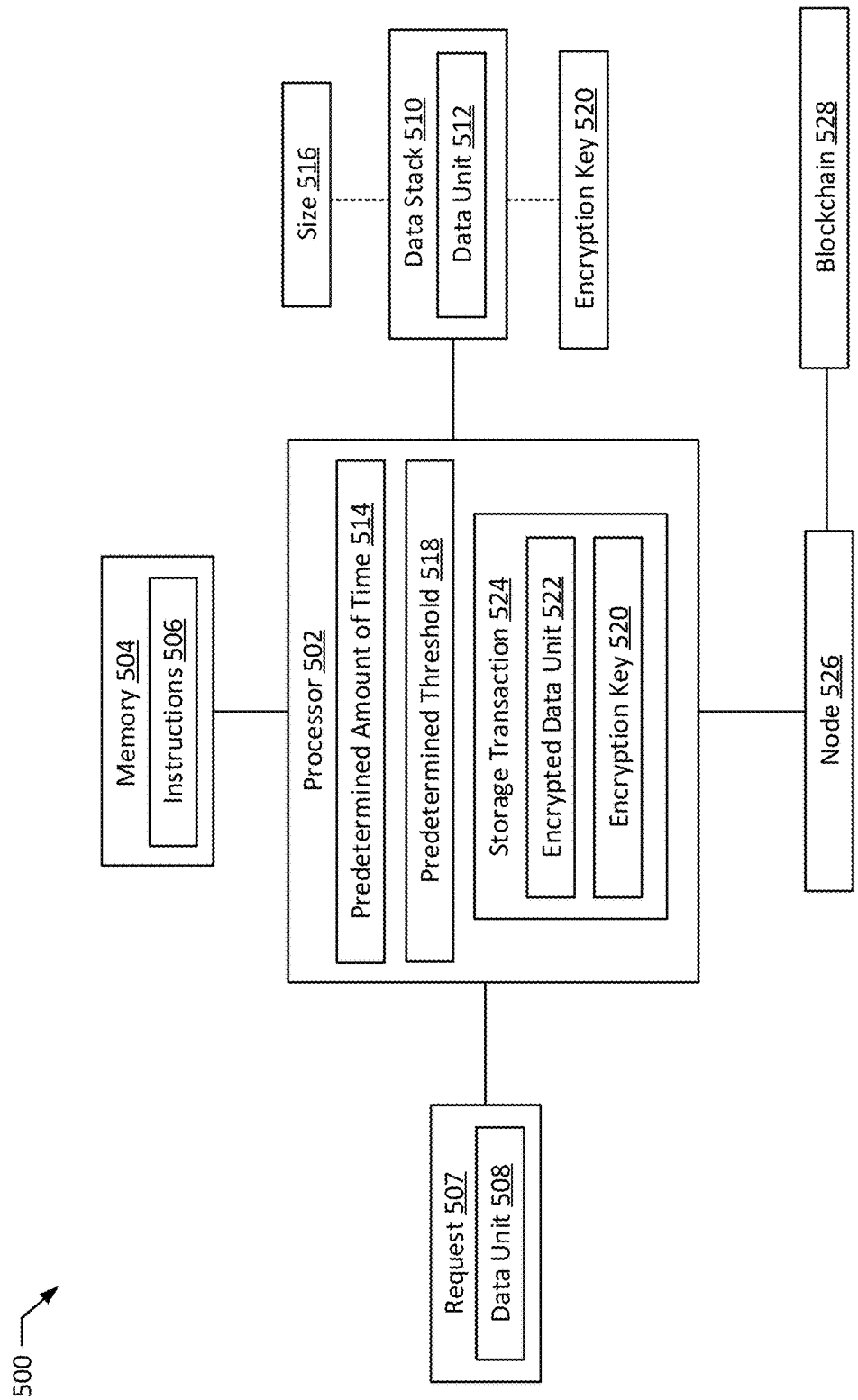
FIG. 5 illustrates a system according to an exemplary embodiment of the present disclosure.

FIG. 5 illustrates a system 500 according to an exemplary embodiment of the present disclosure. The system 500 includes a processor 502 and a memory 504. The memory 504 stores instructions 506 which, when executed by the processor 502, cause the processor 502 to receive a request 507 including at least one data unit 508 for storage and to buffer the at least one data unit 508 in a data stack 510 storing one or more data units 512 until one or both of (i) a predetermined amount of time 514 has passed or (ii) a size 516 of the data stack 510 exceeds a predetermined threshold 518. The instructions 506 may further cause the processor 502 to encrypt the one or more data units 508, 512 stored in the data stack 510 with one or more corresponding encryption keys 520 to generate one or more encrypted data units 522, generate a storage transaction 524 including the one or more encrypted data units 522 and the one or more corresponding encryption keys 520. The instructions 506 may also cause the processor 502 to upload the storage transaction 524 to one or more nodes 526 for storage on a blockchain 528.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving, at a cloud computing environment implemented by a first plurality of computing devices, a request including at least one data unit for storage;

buffering, at the cloud computing environment, the at least one data unit in a data stack storing one or more additional data units until one or both of a predetermined amount of time has passed or a size of the data stack exceeds a predetermined threshold;

encrypting, at the cloud computing environment, the data units stored in the data stack with corresponding encryption keys to generate encrypted data units;

generating, at the cloud computing environment, a storage transaction including the encrypted data units and the corresponding encryption keys; and uploading the storage transaction to nodes for storage on a blockchain, wherein the nodes are configured to combine the storage transaction with a plurality of other transactions into a block for storage on the blockchain, and wherein the nodes are implemented by a second plurality of computing devices separate from the first plurality of computing devices.

2. The method of claim 1, wherein each request in a plurality of requests including a respective data unit are received and wherein encrypting the data units further comprises, for each of the plurality of requests:
generating an encryption key corresponding to the respective request;
encrypting the respective data unit included in the respective request with the encryption key; and
generating an association between the encryption key and the respective data unit, wherein the storage transaction includes the association.

3. The method of claim 1, further comprising,
prior to uploading the storage transaction to the nodes:
signing the storage transaction with at least one private key associated with the request.

4. The method of claim 3, wherein the at least one private key is one of the corresponding encryption keys.

5. The method of claim 3, wherein the at least one private key is a private key associated with a computing device transmitting the request.

6. The method of claim 1, wherein the method is performed at least in part by a provisioning service.

7. The method of claim 6, wherein the storage transaction also includes metadata regarding the provisioning service.

8. The method of claim 7, wherein the metadata includes a volume identifier associated with an instance of the provisioning service.

9. The method of claim 1, wherein the storage transaction also includes an account identifier associated with one or more of a user and a container corresponding to the at least one data unit.

10. The method of claim 1, wherein the blockchain is a cryptocurrency blockchain.

11. A system comprising:
a processor; and
a memory storing instructions which, when executed by the processor, cause the processor to:
receive, at a cloud computing environment implemented by a first plurality of computing devices, a request including at least one data unit for storage;
buffer, at the cloud computing environment, the at least one data unit in a data stack storing one or more additional data units until one or both of a predetermined amount of time has passed or a size of the data stack exceeds a predetermined threshold;
encrypt, at the cloud computing environment, the data units stored in the data stack with corresponding encryption keys to generate encrypted data units;
generate, at the cloud computing environment, a storage transaction including the encrypted data units and the corresponding encryption keys; and
upload the storage transaction to nodes for storage on a blockchain, wherein the nodes are configured to combine the storage transaction with a plurality of other transactions into a block for storage on the blockchain, and wherein the nodes are implemented by a second plurality of computing devices separate from the first plurality of computing devices.

12. The system of claim 11, wherein each request in a plurality of requests including a respective data unit are received and wherein encrypting the data units further comprises, for each of the plurality of requests:
generate an encryption key corresponding to the respective request;
encrypt the respective data unit included in the respective request with the encryption key; and
generate an association between the encryption key and the respective data unit, wherein the storage transaction includes the association.

13. The system of claim 11, wherein the memory contains further instructions which, when executed by the processor prior to uploading the storage transaction to the nodes, cause the processor to:
sign the storage transaction with at least one private key associated with the request.

14. The system of claim 13, wherein the at least one private key is one of the corresponding encryption keys.

15. The system of claim 13, wherein the at least one private key is a private key associated with a computing devices transmitting the request.

16. The system of claim 11, wherein the memory contains instructions which, when implemented by the processor, cause the processor to buffer the at least one data unit and encrypt the data units stored in the data stack using a provisioning service.

17. The system of claim 16, wherein the storage transaction also includes metadata regarding the provisioning service, including at least a volume identifier associated with an instance of the provisioning service.

18. The system of claim 11, wherein the storage transaction also includes an account identifier associated with one or more of a user and a container corresponding to the at least one data unit.

19. The system of claim 11, wherein the blockchain is a cryptocurrency blockchain.

20. A non-transitory, computer-readable medium storing instructions which, when executed by a processor, cause the processor to:
receive, at a cloud computing environment implemented by a first plurality of computing devices, a request including at least one data unit for storage;
buffer, at the cloud computing environment, the at least one data unit in a data stack storing one or more additional data units until one or both of a predetermined amount of time has passed or a size of the data stack exceeds a predetermined threshold;
encrypt, at the cloud computing environment, the data units stored in the data stack with corresponding encryption keys;
generate, at the cloud computing environment, a storage transaction including the encrypted data stack and the corresponding encryption keys; and
upload the storage transaction to nodes for storage on a blockchain, wherein the nodes are configured to combine the storage transaction with a plurality of other transactions into a block for storage on the blockchain, and wherein the nodes are implemented by a second plurality of computing devices separate from the first plurality of computing devices.

* * * * *